Patented Nov. 8, 1949

2,487,600

UNITED STATES PATENT OFFICE 2,487,600

AQUEOUS THIXOTROPIC GEL COMPOSITION

Herman J. Schneiderwirth, Jenkintown, Pa., assignor to Sharp & Dohme, Incorporated, Philadelphia, Pa., a corporation of Maryland No Drawing. Application October 9, 1945, Serial No. 621,382

4 Claims. (Cl. 252—316)

This invention is concerned with gels of water insoluble salts of alkaline earth metals colloidally dispersed in an aqueous medium, which gels are thixotropic, that is, they have a rigid consistency when at rest and after brief shaking or stirring become fluid and pourable in the form of a liquid, stable, homogeneous dispersion or suspension, and in which gels the transformation from the rigid form to the liquid form is reversible and may be carried on from one form to the other without limit.

The thixotropic gels of this invention have a wide field of application and are useful in a number of industrial arts as in colors, and pigments and paints, paper and paper coating, leather finishing, and others.

They also are particularly useful in the pharmaceutical industry in compounding various types of pharmaceutical and therapeutic preparations. Accordingly, the invention especially includes thixotropic gels, in which the required ingredients for contributing the thixotropic characteristics are in and of themselves useful in therapy, for example, to supply necessary metabolic mineral factors, for example, calcium, iron, magnesium, phosphorus, and the like, so that these gels may be thus useful either alone or along with other pharmaceutical or medicinal agents as added ingredients in the thixotropic gel system.

An advantageous feature of such thixotropic gel preparations is the possibility of having the various required therapeutically effective ingredients present in a higher concentration than is ordinarily available in preparations heretofore presented, as well as in a remarkably stable form.

In any event, the thixotropic gels of the invention comprise two essential constituents. The major and primary constituent is a colloidally dispersible water insoluble, alkaline earth metal salt or a mixture of more than one of such salts, which for the therapeutic preparations are those that would be non-toxic in the dosage administered by the selected route. The second ingredient or the minor in percentage is a citrate of an alkaline-reacting, cationic radical such as that of any of the alkali metals or of a nitrogen base, for example, ammonia, ammonia derivatives as the primary, secondary and tertiary aliphatic amines and alkanol amines and quaternary ammonium bases, and the like that are soluble in water or in water at least having up to about 5% citric acid dissolved therein. The second constituent may be prepared in situ from citric acid and the alkaline-reacting agent necessary to form the indicated citrate, or may be used in the form of the already prepared citrate. It may be used in some compositions at as little of a fraction of one percent and in others up to infrequently as much as five percent dependent often on the total solids in the colloidally dispersible alkaline earth metal salts, the lower the total solids, the less citrate while the higher the total solids, the more citrate. In any event, the amount of citrate used should be sufficient to develop the desired degree of thixotropy in the composition of the planned ultimate constitution.

Those gels of the invention in which the colloidally dispersible, water insoluble, alkaline earth metal salt and the citrate of the alkaline-reacting agent are the sole constituents contributing the thixotropic property manifest thixotropy best when the hydrogen ion concentration of the system is between about pH 5.0 and 6.5. However, the thixotropic behavior can be manifested over a much wider pH range including both the acid and alkaline sides when there is included also as a minor portion and as a third constituent a water soluble agent selected from the water soluble carbohydrates and the aliphatic polyhydroxy alcohols particularly the hexitols. Any of the carbohydrates, whether a monosaccharide or a polysaccharide is suitable so long as it is water soluble, for example, monosaccharides such as pentoses as xylose, ribose, or hexoses as glucose (dextrose), mannose, fructose (levulose), mannoheptose, or disaccharides as lactose, maltose, sucrose. Of the water soluble, aliphatic polyhydric alcohols, especially suitable are those that are water soluble and have as many hydroxy groups as there are carbon atoms in the aliphatic chain, particularly the hexitols, for example, sorbitol, mannitol, dulcitol. Such third constituent in the system extends the hydrogen ion concentration range at which good thixotropy is present to from about pH 4.0 to about 11.5 or even higher.

For any desired specific purpose there may be added to the thixotropic system of the invention, for example, as described below as in Examples 4 and 5, whether produced by using the two essential constituents (e. g. Example 4) or the two plus the third (e. g. Example 5), other ingredients compatible with the maintenance of the thixotropic characteristic, which other added ingredients can be included in the system in a higher concentration and more stable form than is ordinarily obtainable in other types of systems. Particularly for therapeutic compositions, there can be included, for example, ingredients for the treatment of metabolic deficiencies as any of the available vitamins or vitamin factors, whether water soluble or oil soluble, or any of the suitable amino acids, proteins, protein hydrolysates, and the like, or antibacterial agents compatible with the system as sulfanilamide and the non-toxic, active sulfanilamide derivatives and other sulfonamides, antibiotics, whether water soluble or not, as penicillin, tyrothricin, streptomycin, and the like, hormones, antacid substances other than those already contained in the major constituent of the system, biologicals as bacterial vaccines, toxoids, virus vaccines, and other therapeutic or pharmaceutical ingredients compatible with the thixotropic system. In most cases the incorporation of these additional pharmaceuticals into the thixotropic gel system of the invention is accomplished by adsorption of the additional agents on the colloidally dispersed, water insoluble, alkaline earth metal salt constituent of the system.

The thixotropic gels of the invention are prepared by a method involving three essential steps. The first of these is the preparation of the water insoluble, alkaline earth metal salts by precipitation under conditions controlling their formation in a collodially dispersed or dispersable form. The second is the concentration of these alkaline earth metal salts, incidentally including partial elimination of the water soluble electrolytes remaining after the precipitation in the formation of the colloidally dispersable water insoluble alkaline earth salts. The third essential step involves the incorporation or addition of the citrate of the alkaline-reacting agent, either by the formation of it in situ or its addition as the desired citrate or mixture of citrates, both of these methods being broadly referred to as incorporating the citrate in the composition.

The formation of the colloidally dispersable, water insoluble, alkaline earth metal salts is caused by reacting two separate solutions of water soluble salts. The first of these solutions, which for convenience is referred to as "solution A," is an aqueous solution of a substance as a salt or mixture of salts, the anion or anions of which will react in aqueous medium with a cation which is an alkaline earth metal to precipitate the corresponding water insoluble, alkaline earth metal salt. Thus, the solute in solution A is, for example, a water soluble sulfate, phosphate, carbonate, silicate or other compound such as an aluminate, molybdate, borate, chromate, malate and others, so long as the anion thereof forms a water insoluble salt with an alkaline earth metal. Then, the cation of the solute of "solution A" should be one which with the anion of the solute of "solution B" (below) forms a water soluble salt.

The second of the necessary solutions, for convenience referred to as "solution B," for use in the preparation of the major constituent of the gel system of the invention is an aqueous solution of a water soluble, alkaline earth metal salt or mixture of such salts, the anion, or anions, of which forms a water soluble salt with the cation or cations of the selected salt or salts in the solution A used in the particular preparation.

Any desired or convenient concentration of the respective solutes may be used in each of the solutions A and B, up to a saturated solution. The latter is generally advantageous for practical purposes. In reacting solution A with solution B, it is sometimes convenient, although not essential, to use equal volumes of each solution. Accordingly, the concentration of the solute in one of the two solutions should be such that the quantitative concentration of its cations is the stoichiometric equivalent of the concentration of the anions in the other solution.

The reaction between the two solutions A and B may be carried out at any convenient temperature preferably below the boiling point of the solutions. However, the lower the temperature in general the smaller is the particle size of the resulting insoluble salt formed and the better is the resulting thixotropic activity, although the results improve as the temperature of the mixture of the two solutions increases from around room temperature to where they are best at between about 55° to about 60° C. and decrease in quality as the temperature then increases further. The results improve and are best as the temperature of the mixture is below room temperature and very best when nearer to 0° C.

Either solution may be added to the other, but the particle size of the precipitated insoluble salt is advantageously smaller when solution B is added to solution A. In either event, the advantageously smaller particle size or better colloidal dispersability is obtained irrespective of the order in which the solutions are added to one another when there is used sufficient of solution B to permit a slight excess of the water soluble alkaline earth metal salt to remain unreacted.

Whichever solution is added to the other, the addition is advantageously carried out with agitation, e. g. shaking or stirring, preferably the latter, which should at least be sufficient to give adequate intimate mixing of the two solutions. When the addition of the one solution to the other is completed, the precipitated water insoluble, alkaline earth salt is homogeneously and stably dispersed throughout substantially the entire aqueous medium and only very little sedimentation occurs on standing, varying from practically none at all to as little as about 5% or more but rarely to as much as 30% of supernatant clear liquid, dependent on the reaction conditions, primarily the temperature, with the least amount of sedimentation when the precipitation is carried out in the temperature ranges of between about 55 to 60° C. and from about room temperature down to 0° C.

The second essential step of the procedure is the concentration of the precipitated, water insoluble, alkaline earth salts, incidentally accompanied by partial removal of the electrolytes formed during the inter-reaction of the solutes of the two solutions A and B. This concentration may be accomplished by convenient means for removal of the aqueous solution of the resulting water soluble salts from the insoluble precipitate, advantageously by first decanting off any supernatant either with or without preliminarily adding more water to the supernatant. The concentration is carried out (and incidentally the major portion of the soluble electrolytes are removed) by filtration, either suction or press, and with or without washing the filter cake. The electrolytes do not have to be completely removed but only practically sufficiently removed as in these concentration steps. If for reasons concerned with the particular composition of the ultimate end product, more complete removal of electrolytes is desired, the press cake may be washed, for example, until a sample of the washings shows only a faint cloudiness upon the addition to it of a solution of silver nitrate when the washings contain chlorides, or only a slight cloudiness upon the addition of barium chloride solution when the filtrate contains dissolved sulfates. When the ultimate end product is to be administered parenterally, the filter cake can go without washing for then the retained electrolytes can help approach isotonicity. If the end product is to be taken orally, further removal of electrolytes may be desirable to avoid too salty taste or interference with absorption of added ingredients.

In many cases the concentration may be done by centrifugation instead of, or in addition to, filtration.

Then, dependent upon the desired concentration of the constituents of the gel in the ultimate end product sought, the necessary further amount of water may be removed from the filter cake preferably by hydraulic pressure using suitable bags or other means for retaining the solids. In this way, moist, water insoluble, alkaline earth metal salt gels containing up to as much and even more than 50% of total solids have been obtained.

The invention may be illustrated by, but not restricted to, the following examples:

Example 1

Solution A was prepared by dissolving 120 grams of disodium phosphate U. S. P. and 18 grams of sodium carbonate U. S. P. in 1500 c. c. of water and cooling to 15° C., and to it were added with stirring solution B consisting of 96 grams of calcium chloride U. S. P. and 5 grams of magnesium chloride crystals dissolved in 1500 c. c. of water and cooled to 5° C. A fine, white, cloudy dispersion of colloidally dispersable particles of insoluble calcium and magnesium carbonates and their phosphates formed. The reaction mixture was permitted to settle over night, after which the small amount of supernatant, clear aqueous solution was decanted off and replaced by a substantially equal amount of fresh water and the reaction mixture permitted to stand over night again, during which time more of the electrolytes migrated into the fresh water on top of the precipitate. The second supernatant was then decanted, after which the precipitated insoluble salt was suction filtered and washed with water until a sample of the washings showed only a slight cloudiness upon the addition of silver nitrate solution, and the suction applied long enough to the filter cake to suck out as much of the water as could practically be removed in that way, after which the filter cake was placed in a pressure bag and additional water expressed from it in a hydraulic press.

Example 2

Solution A was prepared by dissolving 80 grams of sodium sulfate, 20 grams sodium phosphate and 15 grams potassium carbonate in 2000 c. c. of water and to it while stirring was added solution B consisting of 150 grams of barium chloride and 25 grams of strontium bromide dissolved in 2000 c. c. of water and heated to 55° C., after which a fine, white, cloudy dispersion of colloidal particles of insoluble barium and strontium sulfates, phosphates and carbonates formed. The reaction mixture was permitted to settle over night as was that in Example 1, and the precipitated water insoluble, alkaline earth metal salt dispersion was then practically freed of electrolytes by decanting and filtration, and concentrated by hydraulic pressure also as in Example 1.

Example 3

To a solution prepared by dissolving 80 grams of sodium sulfate U. S. P., 20 grams sodium hydroxide U. S. P. and 25 grams sodium silicate (40% solution) in 2000 c. c. of water and cooled to 15° C. were added a solution B consisting of 90 grams of calcium chloride U. S. P., 25 grams magnesium chloride crystals dissolved in 2000 c. c. of water and cooled to 10° C., after which a fine, white, cloudy dispersion of colloidal particles of water insoluble calcium and magnesium silicates and hydroxides and calcium sulfate formed. The reaction mixture was permitted to settle over night as that in Example 1 and the dispersion of precipitated, water insoluble, alkaline earth metal salts was practically freed of electrolytes and concentrated by decanting and filtration, and further concentrated by hydraulic pressure as in Example 1.

The preceding Examples 1, 2 and 3 demonstrate the method of preparing the suspended dispersion of the water insoluble, alkaline earth metal salts of desired particle size as the major constituent for the thixotropic gels of the invention, and their descriptions include the first two essential steps of the method of preparation of the thixotropic gels. The third essential step is the incorporation into the system of the ingredient that develops the thixotropic properties of the insoluble mineral salt gel, namely, the citrate of the alkaline-reactive agent. Thus, the third step of the procedure comprises the addition to the system of such citrate as an alkali metal citrate or ammonium citrate or other citrate of the type hereinabove described (either by formation in situ or by addition of the selected citrate or mixture of citrates) in sufficient quantity to adjust the hydrogen ion concentration of the system to at least between the range of about pH 5.0 to about pH 6.5

However, to develop the thixotropic behavior of the system through the neutral point and over on to the alkaline side even up to pH 10 or 11, from about as little or even less than 5% up to around 20% of the desired suitable carbohydrate of aliphatic polyhydric alcohol such as hexitol is added as the alkalinity is adjusted to the desired point dependent on the desired specifications of the ultimate preparation planned.

While the precipitated, water insoluble, alkaline earth metal salts were illustrated in the proceeding examples as prepared from, for example, sodium carbonate, sodium hydroxide, sodium silicate, sodium sulfate, disodium phosphate and potassium carbonate as solutes in solution A, the applicable solutes are not limited to them. It is possible to use the hydroxide or the corresponding salt such as the carbonate, phosphate, silicate or sulfate of any other of the alkali metals or of the cation ammonium, as well as such salts of any of the alkali metals or ammonium, the anions of which form insoluble precipitates with an alkaline earth cation, as above described. Likewise, while in the preceding examples the solute of solution B is a chloride of one of the alkaline earth metals, there is no restriction to the use of the chloride. There can be used any other water soluble salt of any of the alkaline earth elements, for example, the acetate, nitrate, and the like, so long as the anion of the water soluble salt of the alkaline earth metal will form a water soluble salt with the alkaline metal or the cation ammonium.

The following illustrative, but not restricting, example demonstrates the thixotropic system on the acid sides:

Example 4

2000 grams of the precipitated water insoluble, alkaline earth metal dispersion obtained from Example 1 were placed in a "Pony mixer" and well comminuted, and then 26 grams of USP citric acid were added and mixed into the gel over a period of about 35 minutes, during which the citric acid was completely dissolved and a smooth paste was obtained. Then 13 cc. of 20% sodium hydroxide solution were added while the mixing was continued for 20 minutes. The resulting product had a pH of 5.3 and was a thixotropic gel, as seen by taking a portion of the reasonably fluid content of the mixture and permitting it to stand for a minute or two when it assumed a firm, rigid consistency which on subsequent shaking was converted to the former pourable, liquid form.

A thixotropic system on the alkaline side is illustrated, but not limited to, the following:

Example 5

To 1000 grams of the thixotropic gel obtained from Example 4, there was added 100 grams of beta-lactose and the combination was well mixed for about 20 minutes when the beta-lactose was completely taken into solution. A very decided decrease in viscosity was observed, but a sample of the homogeneous, stable suspension upon being allowed to stand for a couple of minutes took on a firm and rigid consistency which was readily reversed to its original fluidity by slight shaking of it in its container. Change in pH up to 11.0 by addition of alkali did not destroy the thixotropic behavior.

While the thixotropic gel as in Example 4 or Example 5 may be used in the form described in each of the examples as a finished product, for example, as a pharmaceutical preparation for administration of the mineral elements of its contents in the treatment or prevention of a metabolic deficiency in the particular mineral element, the gel of the invention as exemplified in the examples as 4 and 5 may be used as a carrier or as a base into which there can be incorporated other therapeutically effective iningredients of the type hereinabove referred to. In such case, the further ingredient or ingredients to be added to make a desired pharmaceutical composition or preparation may either be incorporated by being mixed into the thixotropic gel resulting, for example, from either Example 4 or Example 5, or it may be incorporated during the steps in which the colloidally dispersable, water-insoluble, alkaline earth metal salts such as prepared in Examples 1, 2 and 3 are further treated to develop them into a thixotropic system. Such procedure can be illustrated by, but not restricted to, the following example:

Example 6

Five thousand grams of the water insoluble, alkaline earth salt dispersion, product of either Examples 1, 2 or 3, containing approximately 35% of total mineral solids, are well mixed and comminuted at a low speed in a "Pony mixer" until a heavy, thick paste results. Then 70 grams of citric acid U. S. P. are added while the agitation is continued and solution occurs in about 20 minutes. Then 18 grams of ascorbic acid (vitamin C) are added and stirring is continued for about 15 minutes, during which time 5 grams of a vitamin concentrate (containing, per gram, vitamin A—450,000 units and vitamin D—90,000 units) and 5 grams of alpha tocopherol are gradually and intimately mixed with 500 grams of beta-lactose. Then this vitamin-lactose mixture is added to the water insoluble, alkaline earth salt-ascorbic acid paste in the "Pony mixer" and the whole is stirred for about 20 minutes, yielding a smooth paste of approximately cold cream consistency. If desired, to this paste there may be added a suitable flavoring agent such as lemon oil or other suitable flavoring agent as well as a preservative such as benzoic acid or some other. There are then added to this smooth paste, while agitating, 37.50 grams of a 20% sodium hydroxide solution and mixing is continued for 5 to 10 minutes during which the preparation is converted into a reasonably fluid dispersion, which upon being filled into bottles sets to a rigid paste due to its thixotropic properties. Accordingly, by moderate shaking this paste is readily converted at will to an easily pourable stable, liquid colloidal dispersion which then after being permitted to rest reconverts into a rigid paste within a few minutes. The finished product shows a hydrogen ion concentration of pH 5.2 and its specific gravity is 1.277.

The daily dosage of two teaspoonfuls or approximately 8 cc. of the product of Example 6 provided 1.073 grams of calcium, 0.652 gram of phosphorus and 0.032 gram of magnesium. As far as is known, such an unusually high concentration of these essential metabolic minerals in a colloidal dispersion of very low viscosity is not obtainable in any other way. If it is desired, even still higher concentrations of the mineral content of any of the thixotropic gels embraced in this invention can be obtained by further expressing in the step in which the hydraulic pressure is employed, even more water from the colloidally dispersable water insoluble, alkaline earth metal salts of the type obtained in the preceding Examples 1, 2 and 3.

Example 7

5000 grams of the colloidally dispersable, water insoluble alkaline earth salts obtained by either Examples 1, 2 or 3, are well mixed and comminuted at a low speed in a "Pony mixer" until a heavy, thick paste results, to which are added 75 grams of citric acid U. S. P. and the mixing continued until they are dissolved, after which there are added 150 grams of liver extract concentrate (1:20), 100 grams of yeast concentrate, 315 grams of rice bran concentrate, 0.6 gram of thiamine hydrochloride, 0.3 gram of riboflavin and 5.0 grams of nicotinamide, and the whole is thoroughly mixed for approximately 40 minutes. Then 30 c. c. of concentrated ammonium hydroxide solution (28% $NH_3$) are gradually added while the stirring is continued. The pH is 4.9. The resulting colloidal suspension pours very freely into bottles and after standing in them for a few minutes converts to a brown rigid, stiff paste, readily reversible to the liquid, pourable state because of the thixotropic property imparted to the composition in its preparation.

In this particular example, it was not necessary to add separately a particular carbohydrate because the latter is present in the rice bran and yeast concentrates as maltose and sucrose so that the latter carbohydrates served the double function of solvent and carriers for the natural vitamin as well as the agent enhancing the thixotropy.

This example illustrates a thixotropic, mineral-vitamin gel, in which the vitamins are members of the vitamin B-complex. Since it is often desirable to have a product containing not only the known pure factors of vitamin B-complex, but also the other factors not yet specifically identified and isolated, in this example the concentrated, unfractionated extracts of fresh liver, yeast and rice polishings (which contain these unidentified factors), were combined with the mineral salts in addition to the included pure crystalline factors.

A further illustration of the unusually high concentration of added therapeutically effective substances that can be included in the thixotropic gels of the invention is the following:

Example 8

To a mixture of 35 grams of finely powdered phthalylsulfathiazole in 30 c. c. of water, are added 10 grams of corn syrup (a carbohydrate) and a thick paste results. To this paste are added a mixture of 0.5 gram of citric acid and 0.6 gram of sodium citrate and the whole is well mixed, showing practically no change in the pasty consistency. Then there are added 45 grams of the colloidally dispersable, water-insoluble, alkaline earth metal salts of Examples 1, 2 or 3 (containing approximately 28% total solids) and the combination is thoroughly mixed, showing a pH of 5.25. The mixture is liquid and readily pourable and when permitted to rest for a couple of minutes converts to a rigid, stiff paste, reversible to the pourable, liquid state, upon shaking or stirring, because of its thixotropic character. It contains 31.8% of phthalylsulfathiazole, although the content of this substance can be increased or decreased to meet any desired specifications.

While Examples 6 and 7 have been prepared respectively with certain individual and specific vitamin content, and Example 8, with a particular sulfonamide derivative, any desired, suitable individual or combination of vitamins or individual or combination of sulfonamides, or of both, or of any of the compatible added therapeutic agents may be employed by similar incorporation into any thixotropic gel prepared according to the invention. Similarly, any other compatible desired medicament may likewise be incorporated as desired in any of the compositions. While Examples 6, 7 and 8 show the incorporation of therapeutically effective ingredients at certain specific stages of the preparation of the compositions, it is possible to include the particular therapeutic ingredients at other stages of the preparation, for example, as additional solute or dispersoid in any of the described solutions A and B. In such event, any of the therapeutic ingredients so included are adsorbed by the subsequently precipitated colloidally dispersed, alkaline earth metal salts. Not only do these thixotropic gel compositions of the invention permit administration of their individual ingredients in a high concentration hitherto unknown in other types of compositions, but also remarkable stability of the added vitamin ingredients is obtained.

Likewise, while the various specific examples such as Examples 4 through 8, describe the use of certain particular water-insoluble, alkaline earth metal salts, certain particular citrates and certain particular carbohydrates, in the respective steps in the preparation of the corresponding thixotropic compositions, any of these various ingredients may be replaced by any other examples of these respective agents as hereinabove described. It is possible, for example, even to employ ferrous or even ferric sulfate as a solute in solution A, when the anions of the solutes in solution B will form a water soluble salt with iron as the chloride or nitrate or acetate, so long as the anions of any other solute in the solution A containing the water soluble iron salt will not react to precipitate an insoluble iron salt.

It is also possible to employ ferrous sulfate as a solute in solution B when the anion of an alkali metal salt used as a solute in solution A will form a water insoluble precipitate with iron, as in the case of a nitrate or acetate or sulfate of iron reacting with a phosphate or silicate of an alkali metal. Copper salts may be similarly employed in corresponding fashion.

The liquid or pourable state of the thixotropic gels of the invention can be referred to as the "sol" state and the rigid state of the composition can be referred to as the "gel" state. The extent or degree of the thixotropy or thixotropic behavior of the compositions embraced by the invention can be modified to a point where it is at a minimum, that is where the difference between the sol and gel states is only very slight, or to a maximum where the difference between these two states is very pronounced, by controlling the concentration of the precipitated, readily dispersible, water-insoluble alkaline earth metal salts, such as are obtained from Examples 1, 2 or 3, employed in the subsequent steps as exemplified by Examples 4 through 8, or by adjusting the hydrogen ion concentration of the thixotropic system by control of the concentration of the citrate or the alkaline-reactive agent, or by the amount of alkaline reacting agent added to react with the quantity of citrate employed, or by controlling the quantity of the carbohydrate or hexitol added to enhance the thixotropic behavior. Accordingly, it is possible to adjust the ultimate content and degree of thixotropic activity of any preparation being prepared to meet selected particular conditions, all with only slight preliminary experimental tests to indicate whether the selected quantities of the different agents are sufficient for the specifications desired.

Any of the therapeutic preparations available by applying the compositions of the invention may be orally as well as parenterally or even externally administered, depending upon the specific requirements. When the thixotropic compositions are in the sol state, they pass easily through a fine hypodermic needle, so that they can be marketed after filling into ampuls, in which they can take on the rigid or gel state and from which they can be removed after shaking by being drawn up into a hypodermic syringe.

Moreover, in the liquid or gel form, the thixotropic compositions of the invention can be carefully dried under vacuum preferably at a low temperature, for example, 30–40° C. From the dried state the thixotropic composition can be restored by addition of the required amount of water which may be more or less than that evaporated from the original composition; or from the dried state, the composition may be prepared in the form of pellets or tablets for use in that form.

In spite of the unusually high mineral element content of the thixotropic compositions of the invention, they are strikingly free of the unpleasant sensation of grittiness and in fact, have a smooth, even, creamy feel. This is due to the method of their preparation, as a result of which the water insoluble, alkaline earth salts are precipitated in a rather smooth physical form and of very small particle size, in dimension even as low as within and between submicron and a few microns.

In any event, the therapeutic compositions prepared according to the invention show satisfactory stability, contain their various ingredients in unusually high concentration, and permit for increased absorption of ingredients of the medicament from the intestinal tract when administered by the oral route.

The thixotropic gels of the invention, as exemplified by Examples 1 through 5, are soluble in dilute hydrochloric or nitric acids, in lactic acid, in 50% phosphorous acid, although less soluble in 75% phosphoric acid, and in saturated citric acid solution upon heating. When an excess of concentrated alkali hydroxide solution is added to such citric acid solutions of the thixotropic gel, a white, voluminous precipitate forms. The thixotropic gels are insoluble in organic solvents such as alcohol, acetone, ether, benzene, chloroform, carbon tetrachloride, and others.

The thixotropic gels of the invention are stable and show no effect from exposure to sunlight and darkness and inconsequential effect on changes in temperature above the freezing point and below the boiling point. For example, no syneresis (e. g., separation of clear liquid above the gel upon standing) is ordinarily observed at room temperature and at temperatures above the freezing point, and any syneresis at room temperature is usually of a negligible degree. Some slight syneresis occurs upon heating, for example, to from 37 to 50° C., but usually the clear liquid above the gel does not exceed 3% of the total original volume of the gel. While the thixotropic gels of the invention may be kept below the freezing point for a short time, if such exposure is for several days or more, the thixotropy is often irreversibly destroyed.

While the above described invention has been illustrated with respect to certain specific embodiments of it, it is understood modifications, variations and substitutions may be made in them, and that the invention is limited solely by the scope of the appending claims.

This application is a continuation-in-part of my co-pending application, Serial No. 457,532, filed September 4, 1942, now abandoned, reading in part:

I have now found that the absorption and utilization of calcium and phosphorus in the body is increased to a considerable extent when these elements are offered with vitamin D in the form of colloidal jellies. In these jellies the minerals and vitamin D are colloidally dispersed or dissolved in water. The jellies form semisolids in which the fluid phase is not free from the solid phase but is imprisoned in it. There is no separation of a portion richer, or one less rich, of the dispersing phase and therefore minerals and vitamins form a semisolid, compact mass which is uniform in composition and which is relatively stable. The jellies are rather concentrated, in one teaspoon full from 1.5 to 2.0 grams of for instance dicalcium phosphate may be provided with vitamin D, in a pleasant tasting form.

Briefly, my new, improved mineral-vitamin jellies provide increased absorption and utilization by the body, relatively high concentration of active ingredients, high palatability and stability.

Although the above general description of my products mentions calcium, phosphorus and vitamin D, products of the same general description but prepared with other minerals and other vitamins have been produced by me as described in detail in the following examples:

*Example 1*

Product 1.—(a) 268 grams of sodium phosphate, dibasic crystals U. S. P. and 45 grams of sodium carbonate, monohydrated are dissolved in 2 liters of hot water.

(b) 95 grams of calcium chloride U. S. P. are dissolved in 2 liters of hot water. Add solution b to solution a slowly while stirring.

Instead of using calcium chloride, in b, other water soluble calcium salts such as calcium nitrate, calcium acetate and others may be substituted for calcium chloride.

Product 2.—(a) 12.5 grams of sodium fluoride and 2.0 grams of sodium carbonate, monohydrate are dissolved in 300 cc. of hot water.

(b) 19 grams of magnesium chloride crystals U. S. P. and 11.5 grams of calcium chloride U. S. P. are dissolved in 300 cc. of hot water. Add solution b to solution a slowly while stirring.

Instead of using magnesium chloride in b, other water soluble magnesium salts such as magnesium lactate, magnesium nitrate and others may be substituted for magnesium chloride.

100 grams of product 2, consisting of finely dispersed calcium-magnesium fluoride and carbonate, are now added to product 1. 2 liters of water are added to the mixture and after thoroughly mixing, the whole is put aside for several day. Thereafter, the clear solution of sodium chloride which has formed above a voluminous precipitate is syphoned off and again water is added to wash out remaining quantities of sodium chloride.

Finally, the voluminous precipitate which has now more or less gelatinized is concentrated by removing more water by means of a centrifuge and/or filter press.

The resulting jelly is white, semisolid and of a butterlike consistency. When spread out in a moderately thick layer, the jelly is transparent and microscopic examination reveals no particles but shows a transparent colloidal film, uniform in composition.

The jelly is now combined with vitamin D. This vitamin is lipoid soluble and is available today either in the form of concentrates derived from fish livers or in the form of irradiated or activated ergosterol or in chemically pure crystalline form. When crystalline vitamin D is used, it is first dissolved in suitable organic solvents such as propylene glycol, carbowax, alcohol, acetone, glycerine and others. When oily concentrates of vitamin D are used, the latter may be added directly to and dispersed in the jelly, or may be first emulsified with water, using emulsifying agent such as gums, like gum karaya, gum tragacanth, gum arabic or other available emulsifying agents.

The emulsification may be carried out for example by mixing intimately 1 part of water soluble gum with 4 parts of the oil soluble vitamin D concentrate and adding to this mixture 2 to 3 parts of water with active trituration until an emulsion is obtained. Instead of using gums, other emulsifying agents such as water soluble alkali metal oleates or oil soluble alkali earth metal oleates may be used. Further, agar-agar or extracts of Irish moss or gelatine or similar mucilaginous substances such as rosin or resinates may be used.

Finally, the vitamin emulsion prepared in one or the other ways described, may be treated in a so called "homogenizer" which is a special type of a colloidal mill and which further reduces the particle size in the emulsion and aids stabilization and uniformity of the emulsions.

The concentrated solutions or colloidal dispersions or emulsions obtained in any of the above described manner, are now added to the mineral jelly and the whole is thoroughly mixed for several hours, preferably under the exclusion of air. As it is possible to obtain highly concentrated vitamin D solutions, dispersions or emulsions, only a fraction of one per cent need to be added to the jelly to obtain the desirable units of vitamin D.

In this way a colloidal mineral jelly is obtained wherein a very finely dispersed suspension, or solution, of vitamin D is evenly adsorbed by the large colloidal surface of the mineral jelly.

The product offers an improved medication to be used for the prevention or cure of diseases resulting from insufficient intake or from insufficient absorption and utilization of calcium and phosphorus. The product is also a valuable adjuvant in the external treatment of certain pathogenic bone and teeth conditions. It may also be used externally in the treatment of wounds, burns and other skin affections.

The product has the following characteristics easily soluble in dilute hydrochloric acid. Insoluble in organic solvents such as alcohol, acetone, benzene, toluene, chloroform. It forms colloidal dispersions in water. When rubbed over surfaces such as skin or others, it is fully transparent. Upon drying a brittle semitransparent layer becomes visible which can easily be rubbed off. The color of the jelly is white, it is practically tasteless and has a butter like, rather firm consistency. It is slightly astringent.

The jelly is heavy, one teaspoon full holds from 12 to 15 grams.

When dried at a temperature of 135 degrees centigrade to constant weight, the total mineral residue is approximately 11%. The minimum prophylactic dosage of three teaspoons full a day provides approximately 2500 U. S. P. units of vitamin D, more than 1200 milligrams of elementary calcium and more than 700 milligrams of elementary phosphorus. In addition small amounts of magnesium, and fluoride are provided.

The jelly may be made more concentrated by increased centrifugating, vacuum evaporation or treatment in a filter press. I have found, however, that for several reasons the most favorable results are obtained when the total dry residue after drying at 135° centigrade is around 10%.

Finally, the palatability of the jelly may be further improved by adding flavoring agents such as vanilla and others.

Example 2

Product 1.—(a) 2000 grams of sodium phosphate tribasic are dissolved in 20 liters of hot water.

(b) 850 grams of calcium chloride U. S. P. are dissolved in 20 liters of hot water. Add solution b to solution a slowly while stirring.

Product 2.—(a) 20 grams of iron chloride crystals are dissolved in one liter of hot water.

(b) 24 grams of sodium phosphate tribasic are dissolved in one liter of hot water. Add solution b to solution a slowly while stirring.

Product 3.—(a) 4 grams of copper sulphate U. S. P. are dissolved in 500 cc. of hot water.

(b) 2.5 grams of potassium carbonate U. S. P. are dissolved in 500 cc. of hot water. Add solution b to solution a slowly while stirring.

Products 1, 2 and 3 which consist of voluminous jelly like precipitates in water are now mixed. 20 liters of water are added and after stirring well, the whole is set aside for several days. Thereafter, the clear solution of sodium and potassium sulphates and chlorides which has formed above a voluminous precipitate is syphoned off and again water is added to wash out remaining quantities of sodium and potassium sulphates and chlorides. After standing for several days the clear salt solutions above the precipitate are again removed.

The precipitate is now concentrated by means of a centrifuge or filter press. A jelly is thus obtained, consisting of calcium, phosphorus, iron and copper, present in the form of colloidal dispersions.

The jelly is now combined with vitamin A and vitamin B₁ and vitamin C.

The methods used in obtaining a colloidal dispersion of these vitamins in the jelly and their adsorption by the jelly are substantially the same as described in Example 1.

Concentrated solutions, or dispersions, or emulsions of these vitamins are thus intimately and evenly dispersed in the jelly. The nature of the vitamins used, particularly their solubility in water or lipoids and their electric charge decides the ways and means to be used to prepare adsorption products of the colloidal minerals and the vitamins. The choice of the methods used to prepare my colloidal mineral-vitamin adsorption products depends upon the forms in which these vitamins are available at the time.

In Example 2 I have described the preparation of a colloidal mineral-vitamin jelly containing more than one vitamin and additional minerals namely iron and copper.

Although I have found that in the majority of the many different samples of colloidal mineral-vitamin adsorption products prepared by me, the jellies kept well without the addition of gelatinizing agents, the latter did improve stability and uniformity in some of the experimental series. I therefore wish to include the use of such agents for the preparation of my products in my patent application. Gelatinizing agents which I have added to some of my experimental products for better stabilization include pectins, agar, gelatine and others.

It is, of course, evident that minerals and vitamins other than those mentioned in my examples may be used in the same manner to product colloidal mineral-vitamin jellies. Also the quantities of the chemicals used in the above examples may be changed to obtain an optimum ratio between the different minerals from a therapeutic point of view.

The essence of this development is the production of colloidal jellies or colloidal gels formed by precipitated mineral compounds in the manner described and dispersing in these jellies or gels vitamins which have beeen previously emulsified with water by means of different emulsifying agents or which have been previously dissolved in water or other solvents. In this way colloidal mineral-vitamin adsorption products are obtained. These products are utilized by the body to a higher degree than mixtures of minerals and vitamins offered in a form different from my products. The latter are concentrated very palatable and stable, and they therefore present a distinct improvement in their respective field, of application over products previously known.

What is claimed is:

1. An aqueous thixotropic gel system comprising an aqueous vehicle, at least one water insoluble alkaline earth metal salt of the group consisting of phosphate, carbonate, sulfate and hydroxide, stably suspendably dispersed therein, and a water soluble citrate of an alkaline base dissolved in said aqueous vehicle in an amount sufficient, but not over 5%, to produce the thixotropic character of the system, said alkaline base being a member of the group consisting of the alkali metal bases and the nitrogen bases, said thixotropic gel system having a pH of 5.0–6.5.

2. An aqueous thixotropic gel system comprising an aqueous vehicle, a water insoluble alkaline earth metal phosphate salt stably suspendably dispersed therein, and a water soluble citrate of an alkaline base dissolved in said aqueous vehicle in an amount sufficient, but not over 5%, to produce the thixotropic character of the system, said alkaline base being a member of the group consisting of the alkali metal bases and the nitrogen bases.

3. An aqueous thixotropic gel system comprising an aqueous vehicle, a water insoluble, alkaline earth metal carbonate salt stably suspendably dispersed therein, and a water soluble citrate of an alkaline base dissolved in said aqueous vehicle in an amount sufficient, but not over 5%, to produce the thixotropic character of the system, said alkaline base being a member of the group consisting of the alkali metal bases and the nitrogen bases.

4. An aqueous thixotropic gel system comprising an aqueous vehicle, at least one water insoluble alkaline earth metal salt of the group consisting of phosphate, carbonate, sulfate and hydroxide, stably suspendably dispersed therein, and a water soluble citrate of an alkaline base dissolved in said aqueous vehicle in an amount sufficient but not over 5%, to produce the thixotropic character of the system, said alkaline base being a member of the group consisting of the alkali metal bases and the nitrogen bases.

HERMAN J. SCHNEIDERWIRTH.

REFERENCES CITED

The following references are of record in the file of this patent:

UNITED STATES PATENTS

| Number | Name | Date |
|---|---|---|
| Re. 21,690 | Bond | Jan. 14, 1941 |
| 1,943,584 | Cross | Jan. 16, 1934 |
| 2,169,983 | Walton | Aug. 15, 1939 |
| 2,277,854 | Lecoq | Mar. 31, 1942 |
| 2,359,413 | Freedman | Oct. 3, 1944 |
| 2,381,621 | Schmelkes et al. | Aug. 7, 1945 |
| 2,384,564 | Roseman | Sept. 11, 1945 |
| 2,405,861 | Tod | Aug. 13, 1946 |
| 2,420,308 | Gates | May 13, 1947 |
| 2,441,729 | Steiner | May 18, 1948 |